R. F. BRINER.
TRAP NEST.
APPLICATION FILED OCT. 22, 1912.
1,102,386.
Patented July 7, 1914.
3 SHEETS—SHEET 1.
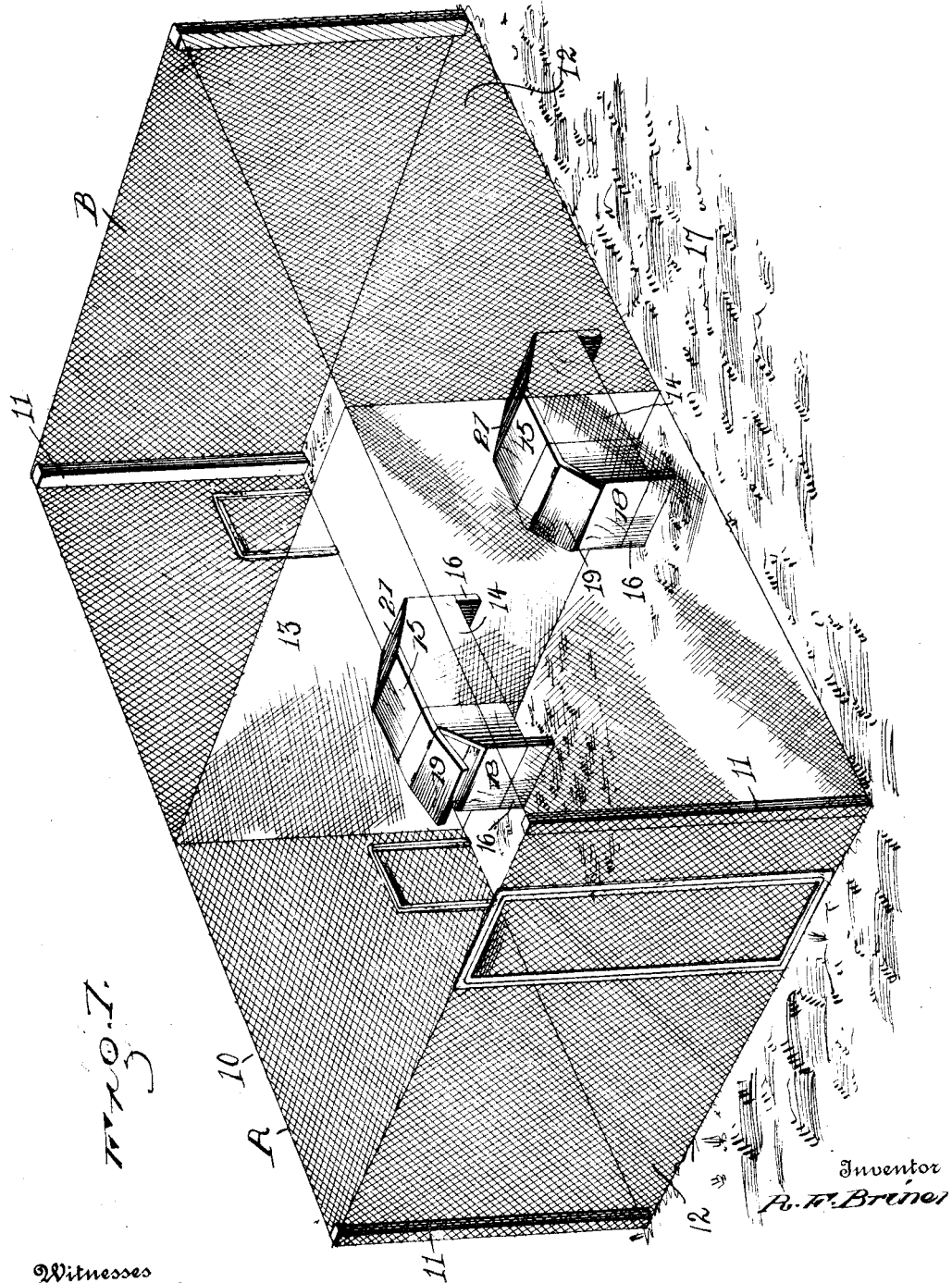

R. F. BRINER.
TRAP NEST.
APPLICATION FILED OCT. 22, 1912.
1,102,386.
Patented July 7, 1914.
3 SHEETS—SHEET 2.
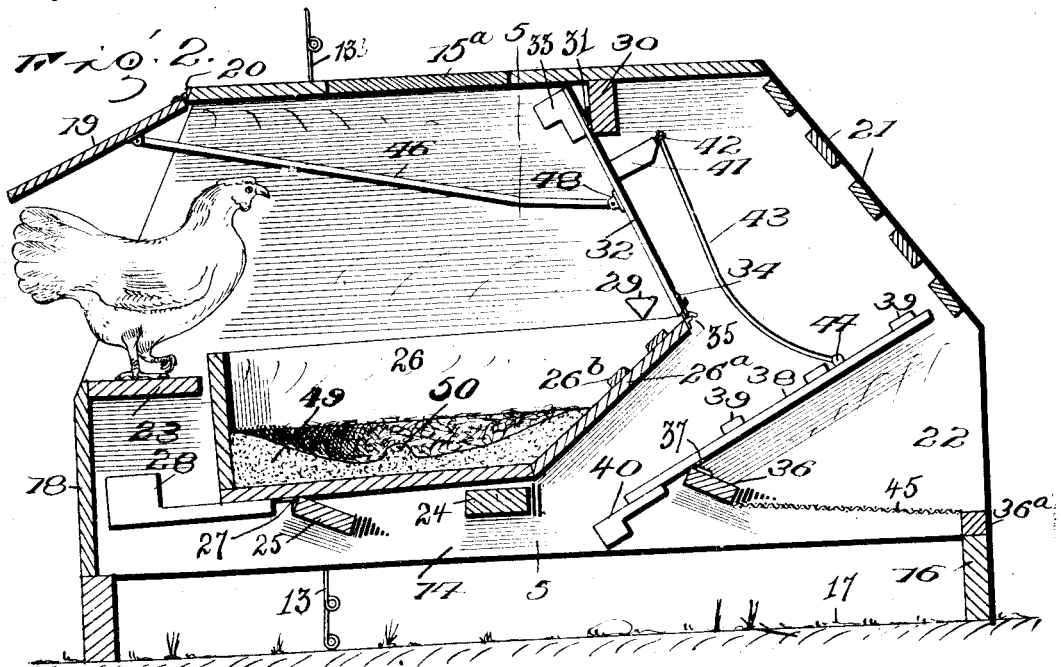
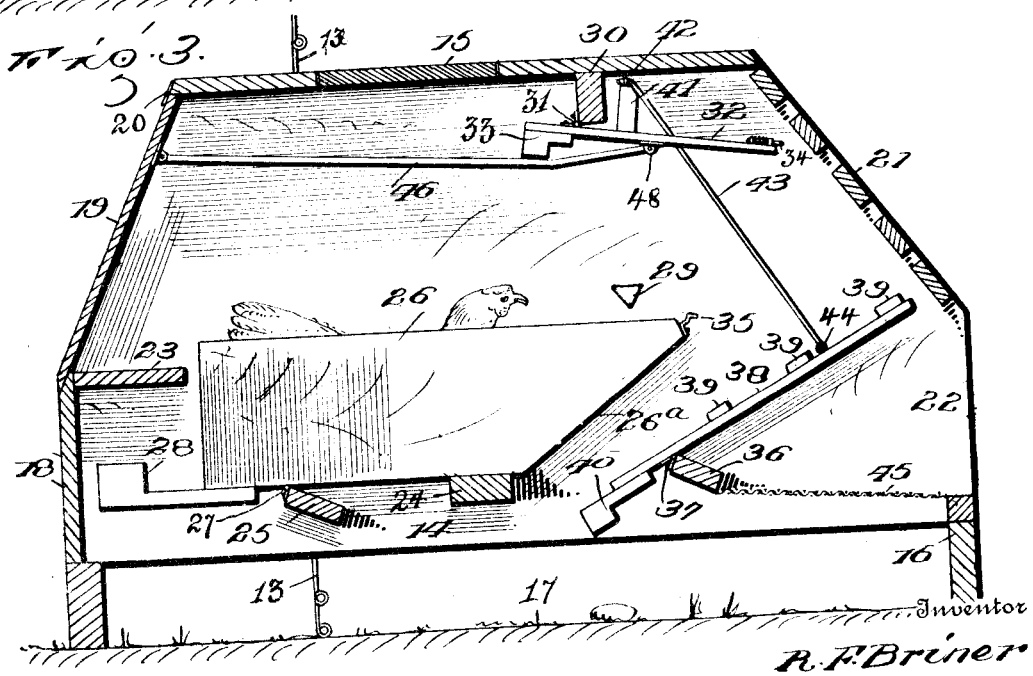

R. F. BRINER.
TRAP NEST.
APPLICATION FILED OCT. 22, 1912.
1,102,386.
Patented July 7, 1914.
3 SHEETS—SHEET 3.
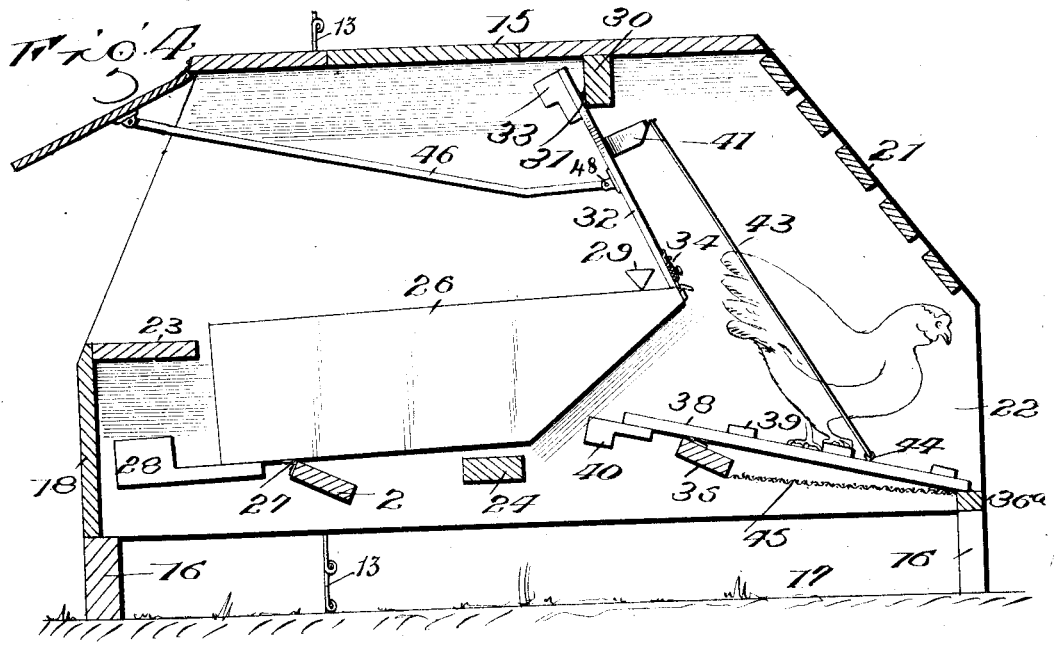
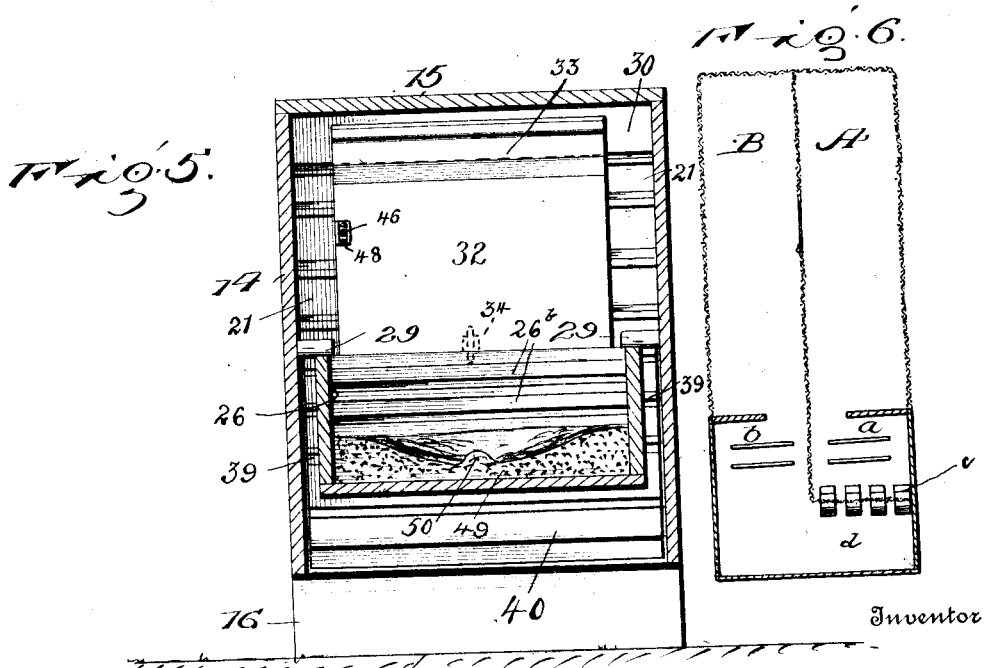
Inventor
R. F. Briner
By Hansen, Attorneys.
Witnesses

UNITED STATES PATENT OFFICE.

ROBERT F. BRINER, OF SARATOGA, WYOMING.

TRAP-NEST.

1,102,386.

Specification of Letters Patent.

Patented July 7, 1914.

Application filed October 22, 1912. Serial No. 727,266.

*To all whom it may concern:*

Be it known that I, ROBERT F. BRINER, citizen of the United States, residing at Saratoga, in the county of Carbon and State of Wyoming, have invented certain new and useful Improvements in Trap-Nests, of which the following is a specification.

My invention relates to poultry nests, and particularly to a form of nest which will act to seclude the hen while laying, and whereby the hens which have laid may be separated from the hens which have not laid during the day.

The main object of my invention is the provision of means whereby hens which do not lay may be separated from hens which do lay, this separation being accomplished without any adventitious aid from the poultryman.

A further object is to provide a separating nest box from which the hens do not have to be released individually, the box being so constructed that the hens may pass on and out of the box one by one into an inclosed space after their eggs have been laid. This permits the poultryman when gathering his eggs in the evening to make a note in his egg record book of the hens which have not laid. He then allows the hens that have laid to pass through a door into an adjoining pen that contains the hens that did not lay during that day. The following day all the hens will be in front of, or in the pen leading to the entrance of the nest box and the operation is repeated.

A further object is to so construct the nest that the hens are not subjected to unhealthy confinement as in the case of trap nests, and so to form the nest box that when the hen has laid an egg she is at liberty to pass out into the pen or inclosure that contains the hens that have laid that day.

A further object is to so construct the nest box that as the hen steps out of the nest after laying, she opens the entrance door of the nest box for the next hen that wants to lay.

A still further object in this connection is to make the nest box automatic in its operation so that it shall not require any attention from the poultryman during the day, and so that one nest box may do for many hens, thereby reducing the number of nests required where, as in trap nests, a nest is used practically for each hen or closed until such time as the poultryman can conveniently release the hen from the nest.

A further object is to so construct the nest that gravity alone is depended upon to open the doors during the entrance to and exit from the nest box, thus relieving the hen from the necessity of opening the doors with the force of her shoulders or sides in order to release herself from the nest. It will be seen that my improved separator nest separates the hens who have laid from those hens who have not laid and that by providing the hens with vari-colored leg bands it is possible for the poultryman to keep a record of what hens have laid and thus at the end of a predetermined time be able to determine what hens are good layers and what are not, furthermore doing away with parts with which the hen is liable to come in contact.

A further object is to so construct the nest box that the entrance and exit doors will operate noiselessly and will therefore not frighten the hen.

A still further object is to provide means whereby the hinged platform which forms the exit door of the nest can be blocked so that it can not drop below the upper end of the exit opening, thus permitting the nest box to be used as a trap nest during the breeding season if desired in order to identify each hen with her own egg.

A further object is to so construct the nest box that the hen on the nest box can not be molested by hens in front of or in the rear of the nest box and the hens on the outside can not interfere with the successful operation of the doors and platform.

Again a further object is to so arrange the entrance to the nest that the hens must jump up in entering and so form this entrance that only one hen can enter at a time, thus eliminating the possibility of injuring one hen near the nest by the closing of the front door when another hen is just going on the nest.

A further object of the invention is to construct the nest box entirely of sheet iron or other like refractory material and use in connection therewith a cast or molded asbestos nest instead of one made of excelsior, hay or straw, thus permitting the entire structure to be cleaned of vermin by passing the flame of a blow torch over it, and a further object in this connection is to so form the asbestos lining to the nest box that an asbestos egg may be cast with the nest, thus making the structure fire-proof and capable of being readily cleaned of vermin.

Other objects will appear in the course of the following description.

A form of my invention is illustrated in the accompanying drawings wherein:

Figure 1 is a perspective view of a portion of a poultry yard with my improved separator nest arranged therein. Fig. 2 is an enlarged longitudinal section of the separator nest, the parts being in position to receive the hen. Fig. 3 is a similar view to Fig. 2 but showing the hen as on the nest. Fig. 4 is a similar view to Fig. 3 but showing the parts in the position when the hen is about to leave the nest. Fig. 5 is a transverse section on the line 5—5 of Fig. 2. Fig. 6 is a diagrammatic view of a poultry yard showing the position of the separator nests with relation to two compartments or divisions of the yard.

Corresponding and like parts are referred to in the following description and indicated in all views of the accompanying drawings by the same reference characters.

Generally speaking, the poultry yard with which my improved separator nests are intended to be used consists of an inclosure of any suitable character divided by a partition so as to form two compartments or divisions designated in Fig. 1 as A and B, the compartment A, for instance, being used to contain those hens which have not laid and the compartment B inclosing those hens which have passed through the nest box and have laid, so that the hens that have laid are separated from the hens that have not laid. The view illustrated in Fig. 1 is entirely diagrammatic and the proper arrangement of the poultry yard is illustrated in Fig. 6 and will be later described. As illustrated in Fig. 1, however, the yard is shown as inclosed by wire fencing 10 supported on posts 11, the yard being divided into two divisions A and B by means of a transverse partition of wire netting designated 13.

A plurality of my separator nests are designed to be so disposed as to intersect the partition 13, the entrance to each separator nest being located within the compartment or division A, while the exit end of each separator nest is located within the division B so that access from one compartment to the other is obtained only by passing through a nest. From the compartment or division B a door leads into a runway or passage, and opening into this passage from the division A is a door. Thus the poultry which have laid during the day may afterward, as for instance at night, be driven back into the division A so as to be ready for the next day. A gate is also provided in the wall of either the compartment A or B whereby the poultryman may have access to the nest to remove the eggs therefrom.

Each separator nest comprises an exterior casing which may be made of any suitable material such as the product known as compoboard, a combination of alternate layers of cement and wood, wood or metal, and this casing is formed with spaced sides 14 and a top 15, a portion of the top being hinged as at 15ᵃ to permit access to be had to the nest for the removal of the eggs.

The casing is preferably mounted upon suitable supports 16 of any desired character so as to support the nest a distance above the ground as at 17. The entrance end of each nest is provided with a vertically extending wall 18 which forms a partial closure to the nest, and extending inward from the upper end of this wall 18 so as to form a stationary platform for the hen is a support or rest 23. Disposed between the top of the casing and the upper end of the wall 18 is an entrance door 19 hinged at 20 to the top of the casing, and when closed bearing at its lower edge against the upper edge of the wall 18 as illustrated in Fig. 3. At the discharge or exit end of the casing the sides 14 are sloped downward at their upper portions, these sloping portions of the side being connected by a plurality of transverse slats 21 spaced from each other so as to permit the entrance of light. The lower portion of the casing below the lowest slat 21 is open so as to permit the exit of the hen. Extending transversely across the lower portion of the casing is a support and stop 24, and extending transversely of the casing and located between the support 24 and the wall 18 is a support 25 which is preferably inclined downward so that its upper rear corner will form a fulcrum for the nest box 26. This box 26 is hinged toward its rear end to the support 25 as at 27 and projecting rearward from the lower corner of the nest box is a counterweight 28 normally acting to hold the nest box in a raised position, that is, in the position shown in Fig. 2 with the upper edge of the sides of the nest box bearing against a stop or stops 29. This stop 29 does not extend entirely across the casing but projects outward from the side 14 only a sufficient distance to engage with the side of the nest box. There may be two of these stops one on each side but ordinarily one is sufficient.

The nest box 26 is shown as rectangular in form, the forward end of the box being upwardly inclined as at 26ᵃ and provided with cleats 26ᵇ facilitating the exit of the hen from the nest box. This nest box may be formed in any suitable manner and of any suitable material but preferably is of metal and lined with asbestos as will be later described.

Extending across the upper portion of the casing and preferably attached to the top is a supporting member 30 and hinged to the lower rear edge of this supporting member at 31 is a balanced door 32 which has a counterweight 33 attached to its upper edge above the hinge 31. The lower edge of this door is adapted to contact with and engage the forward upper edge of the inclined forward end 26ª of the nest box when the nest box is in its raised position as shown in Fig. 2.

A spring actuated bolt 34 or like device is mounted upon the lower edge of the door 32 and this bolt is adapted to engage a keeper 35 carried upon the upwardly sloping end of the nest box so that when the parts are in the position shown in Fig. 2, the balanced door will be locked from any upward movement. When, however, a hen arrives in the nest box, the nest box will move downward to the position shown in Fig. 3, thus releasing the keeper 35 from the bolt 34 and permitting the door 32 to move upward to the position shown in Fig. 3. The counterweight 33 is just sufficient to balance the door 32 and the door is moved from the position shown in Fig. 2 to that shown in Fig. 3 by the weight of the entrance door 19, this entrance door being connected to the door 32 by means of a connecting rod 46 which is pivoted to the inner face of the door 19 and to the inner face of the door 32 as at 48.

Extending across the forward end of the casing and about in line with the supporting member 24 is a supporting member 36 which is downwardly and forwardly inclined so that the rear upper corner forms a fulcrum and hingedly mounted upon this member 36 by means of a hinge 37 is a balanced platform 38 provided upon its upper face with a plurality of transverse cleats 39. The door 38 projects rearward beyond the fulcrum point and hinge 37 and is counterbalanced by means of a weight 40 so that the door will not only occupy the position shown in Fig. 2 but so that it may be lowered to the position shown in Fig. 4 in order to permit the exit of the hen. When the balanced platform 38 is moved down to the position as in Fig. 4, the forward edge of the platform will rest upon a transverse supporting member 36ª. An arm 41 projects from the balanced door 32, and extending from this arm 41 to the balanced platform 38 is a flexible connection such as a chain or cord designated 43 which is attached at 42 to the arm 41 and at 44 to the door 38. It will be seen that by reason of this attachment, the door 19 will act, when it closes by the release of the balanced door 32 and the rotation of this balanced door, to draw the balanced platform up to the position shown in Fig. 3. It will thus be seen that when the parts are in the position shown in Fig. 3, the entrance end and the exit end of the casing are closed, but that immediately the balanced platform 38 is de- pressed, as when the hen steps thereon, the flexible connection 43 will draw the balanced door 32 to the position shown in Fig. 2 and the door will automatically latch against the forward end of the nest box 26. The rotation of the door 32 to the position shown in Fig. 2 will, of course, cause the opening of the door 19 so that immediately a hen has stepped from the nest, the entrance door opens ready for the entrance of another hen and this door 19 is held open until the next succeeding hen has settled on the nest.

In order to prevent hens from loitering underneath the balanced platform 38, I provide a screen made preferably of poultry wire, this screen being designated 45 and being attached to the stop 36ª and the transverse member 36. Hens will not loiter in the space beneath the balanced platform for the reason that the wire 45 will hurt the feet and as a consequence hens will neither be hurt by getting beneath the balanced platform, nor will they interfere with the hens coming off the nest.

Preferably the nest boxes are placed as illustrated in Fig. 6 wherein A and B designate parallel runs, yards or divisions corresponding to the inclosures A and B in Fig. 1. The nest boxes themselves are placed within a housing or inclosure so as to be out of the weather. As illustrated, the wire netting which forms a partition between the yards A and B is extended through this inclosure and then turned at right angles and the nest boxes $c$ are placed so as to intersect this wire netting. Each of the houses is, of course, divided into two compartments $a$ and $b$ corresponding to the yards A and B.

In the morning all the hens will be in the yard A or in the compartment $a$ of the house. As the hens lay they pass through the nest boxes $c$ into the passageway $d$ and over into the compartment $b$ or into the yard B. If the poultryman does not gather the eggs until late in the evening, the hens can go to roost upon roosts disposed within the housing $b$ and in the morning they can be driven back to the yard A through any suitable door. This arrangement permits the poultryman to readily collect the eggs and clean the dropping boards under the roosts, these roosts being placed above the separator nests. It will, of course, be understood that I have illustrated this arrangement of yard simply to show more clearly how my separator nests operate.

While I do not wish to limit myself to any particular form of nest box 26, I preferably form the nest box of metal and preferably line it with asbestos lining designated 49 which is preferably molded. Preferably this asbestos lining has a concave contour and at the bottom is bulged at one point as at 50 to provide a semblance of an egg and do away with the use of nest eggs. The concavity in the asbestos lining is filled or partly filled with loose asbestos fiber. It will be seen that this construction makes the entire structure fire-proof, and further that to cleanse the nest it is only necessary to pass the entire casing through a flame or direct a flame upon it by means of a blow torch. This will kill any vermin which may infest the nest.

In connection with the separator nest, a series of leg bands of different colors or contours is provided, one of these distinguishing leg bands to be placed around the leg of each hen or other female fowl to differentiate her from every other fowl. This permits the poultryman to keep an individual egg record of his hen without handling her. At the present time it is necessary for the poultryman to handle each hen separately and read the number on her leg band. This tends to frighten the hens and entails a considerable expenditure of time where several hundred or several thousands of hens are being kept.

The operation of my improved separator nest will be obvious from what has gone before. As before stated, in the morning all the hens are gathered together within the inclosure A leading to the nests. The entrance doors 19 are of course open. A hen jumps up upon the board 23 and then jumps down into the nest box and settles on the nest. As soon as the hen has jumped into the nest box, her weight will counterbalance the weight 28 and the nest box will rock downward, withdrawing the keeper from its engagement with the latch 34 and permitting the door 19 to close, the weight of the door 19 lifting the balanced door 32 to the position shown in Fig. 3. Under these circumstances, the entrance opening is closed and the exit opening is also closed by the balanced platform 38 and the hen is entirely secluded. When the egg has been laid and the hen desires to leave the nest, she will move forward toward the light entering between the slats 21. Doing so, she will climb up the forward inclined portion 26ª of the nest box and will rest upon the forward end of the nest box and from thence will jump onto the balanced platform 38. The weight of the hen upon the platform 38 will cause a depression of the platform, and this through the connection 43 will cause a rotation of the balanced door 32 and a lifting of the entrance door 19. The hen can only leave the nest box when the balanced platform has reached the position shown in Fig. 4 and when it has reached this position, the latch 34 has engaged the keeper 35 so that when the hen leaves the platform, though the balanced platform can rise the door 32 will not open and the door 19 will remain open for the entrance of another hen.

It will be noticed that the hens do not have to be released individually, but that they liberate themselves when they leave the nest, and by using vari-colored leg bands, or leg bands having other distinguishing characteristics, it is possible to identify the hen without handling as before stated. Inasmuch as the hens pass successively through the egg boxes and liberate themselves, one of the nest boxes will take care of as many hens as four or eight trap nests will take care of, for the reason that the nest box being automatic in operation does not require any attention from the poultryman during the day. Furthermore, in the evening when the poultryman gathers his eggs, he has to gather the eggs from only one-fourth to one-eighth as many nests as he would if he used trap nests.

By blocking up the hinged platform 38 so that it can not drop below the lowest slat 21, the nest box can be used as a trap nest during the breeding season if desired. This is possible by reason of the fact that there is a flexible connection 43 between the balanced platform and the door 32 so that the door 19 will remain open until the hen has reached the nest but will then close and will remain closed even after the hen has laid the eggs.

It will be seen that the hen on the nest can not be molested by hens in front of, or by hens in rear of, the nest box and the hen on the outside can not interfere with the successful operation of the doors and platform. By elevating the entrance to the nest so that the hens must jump up in entering, and by making this entrance just wide enough for one hen to enter at a time, the possibility of injuring one hen who happens to be near the nest by a closing of the entrance door when another hen is just going on the nest is eliminated. In traps as now in use, it frequently happens that a hen is caught in the moving mechanism because she follows too closely another hen going on the nest, or happens to be too close the exit when the hen comes off the nest. This is practically impossible with my construction.

What I claim is:

1. In a separator nest, a casing having an entrance opening and a separate exit opening, a depending nest box therein, a gravity closing entrance door, a depressible platform disposed between the nest box and the exit opening normally obstructing exit from the nest through the exit opening, means operatively connecting the depressible platform to the entrance door to cause the opening of the door upon a depression of the platform under the weight of a hen, means for holding the entrance door in an open position when no hen is in the nest box and the latter is raised, and means for releasing the door to permit it to close when the nest box is depressed.

2. In a separator nest, a casing having an entrance opening and a separate exit opening, an entrance door hinged at its upper end to the casing and movable by gravity to a closed position, a depressible nest box disposed between the entrance and exit openings, a hinged member disposed above the nest box and operatively connected to the entrance door, coacting latching devices on the hinged member and nest box whereby to latch the hinged member in position to hold the entrance door open when the nest box is raised, a depression of the nest box acting to release said hinged member to permit the entrance door to close, means normally obstructing the exit opening but movable to a position to permit the exit of the hen, and connections between said obstructing member and the entrance door to cause the opening of the entrance door upon a movement of the obstructing member out of its obstructing position.

3. In a separator nest, a casing, a hinged entrance door, a depressible nest box within the casing, a member hinged above the nest box and having its lower end engageable with the forward end of the nest box, a connecting rod between said hinged member and the entrance door, latching devices mounted upon the hinged member and the nest box to engage the hinged member with the nest box when the latter is in a raised position but disengageable when the nest box is depressed to permit the closing of the entrance door, and a depressible platform mounted in advance of the nest box and operatively connected with the hinged member to cause a rotation of the same into locking engagement with the nest box upon a depression of the platform under the weight of a hen.

4. In a separator nest, a casing having an entrance opening at one end and an exit opening at the other end, a hinged, gravity closing door controlling the entrance opening, a counterweighted platform movable independently of the entrance door disposed adjacent the exit opening and between the nest box and the exit opening and normally held in position to prevent any entrance into the casing by means of the exit opening, a depressible nest box, means normally holding the entrance door open, means actuated by a depression of the nest box for releasing said door to permit it to close and means actuated by a depression of the platform for raising said entrance door.

5. In a separator nest, an open bottomed casing having an entrance opening and an exit opening, a nest box within the casing, a balanced platform disposed adjacent the exit opening and normally supported in an upward and forwardly extending position to obstruct said exit opening, and netting disposed horizontally in the forward end of the casing above the bottom edge thereof and beneath said balanced platform.

6. In a separator nest, a casing having an entrance opening and an exit opening, the entrance opening being disposed above the bottom of the casing, a nest box pivoted at its rear end within the casing, a counterweight acting to raise the forward end of the nest box but permitting the nest box to be depressed under the weight of a hen, a balanced door pivoted within the casing above the forward end of the nest box, an entrance door hinged at its upper end to the casing and controlling the entrance opening, a connecting rod between the entrance door and the balanced door whereby when the balanced door is moved to a position to engage with the forward end of the nest box the entrance door shall be held opened, latching devices carried on the forward end of the nest box and the adjacent edge of the balanced door whereby to hold the balanced door in engagement with the nest box when the nest box is raised and thereby hold the entrance door open, a balanced platform disposed immediately in advance of the nest box and normally supported in an upwardly and forwardly extending position, said balanced platform controlling the exit opening, and a flexible connection between said platform and the balanced door whereby a depression of the balanced platform will cause a depression of the balanced door to a position in engagement with the nest box.

7. The combination with a poultry yard divided into opposed compartments, of a separator nest extending into each of said compartments and comprising a casing having an entrance and an exit opening, a door hinged at its upper end and adapted to close the entrance opening, a nest box pivotally mounted within the casing and counterweighted at its rear end, means engaging with the nest box when in its raised position for holding the entrance door open when the nest box is raised but releasable upon a depression of the nest box to permit the entrance door to close, a balanced platform disposed at the exit end of the casing and normally held in a position to obstruct the exit opening, and means operatively connecting the balanced platform with the entrance door whereby the entrance door shall be opened upon a depression of the balanced platform.

8. In a nest box, a casing having opposed sides and a top, the casing being formed with an entrance opening at one end and an exit opening at the other, the entrance opening being located above the bottom of the casing, a platform extending inward from the entrance opening, a door hinged to the top of the casing at the entrance end and closing by gravity, a nest box pivotally mounted at its rear end within the casing, a counterweight holding the forward end of the nest box normally raised, said nest box being depressible under the weight of a hen, a balanced door hingedly mounted within the casing above the forward end of the nest box, a weight acting to move said door to an approximately horizontal position, a connecting rod disposed between said balanced door and the entrance door, a keeper mounted upon the forward end of the nest box and having an inclined lip, and a spring actuated bolt carried upon the edge of the balanced door and engageable with said keeper whereby when the nest box is raised the balanced door will be held in a depressed position but whereby when the nest box is depressed the balanced door will be released to permit the entrance door to close.

In testimony whereof I affix my signature in presence of two witnesses.

ROBERT F. BRINER.

Witnesses:
C. C. HICKOK,
FRANK MUNZ.